United States Patent [19]

Virdee

[11] Patent Number: 4,887,071
[45] Date of Patent: Dec. 12, 1989

[54] DIGITAL ACTIVITY LOSS DETECTOR

[75] Inventor: Nirmal S. Virdee, Phoenix, Ariz.

[73] Assignee: Siemens Transmission Systems, Inc., Phoenix, Ariz.

[21] Appl. No.: 233,702

[22] Filed: Aug. 18, 1988

[51] Int. Cl.$^4$ .................. G08B 21/00; G06F 11/00
[52] U.S. Cl. .................... 340/659; 371/62; 307/443; 307/517; 307/328; 307/296.4; 370/111
[58] Field of Search ............ 340/659, 373, 870.19, 340/870.24, 870.2; 307/443, 517, 328, 296.4; 371/62; 377/44; 375/104, 119, 118; 370/80, 111; 323/211

[56] References Cited

U.S. PATENT DOCUMENTS

| | | | |
|---|---|---|---|
| 4,017,724 | 4/1977 | Finger | 364/481 |
| 4,196,362 | 4/1980 | Maehashi | 307/350 |
| 4,455,456 | 6/1984 | Cochran | 379/351 |
| 4,566,111 | 1/1986 | Tanagawa | 371/62 |
| 4,633,194 | 12/1986 | Kikuchi | 377/44 |
| 4,763,342 | 8/1988 | Ambrosio | 377/44 |
| 4,839,908 | 6/1989 | Takayama | 375/104 |

FOREIGN PATENT DOCUMENTS 2804950  6/1979  Fed. Rep. of Germany .

Primary Examiner—Donnie L. Crosland
Assistant Examiner—Kinfe-Michael Negash
Attorney, Agent, or Firm—Jeffrey P. Morris

[57] ABSTRACT

A digital activity detection circuit is provided for monitoring digital input signals such as telecommunications DS1 or DS2 signals, and for generating an alarm when a predetermined input signal loss threshold is reached, such that the input signal loss threshold does not vary with temperature, with component value or with power supply variations. Precise resolution and simplified hardware are achieved in a novel arrangement of counters in the signal activity detector to determine the resolution and signal loss threshold of the detector, all in a digital arrangement without the use of analog devices or retriggerable monostable multivibrators, and in an ASIC fabricable integrated circuit technology such as CMOS.

11 Claims, 3 Drawing Sheets

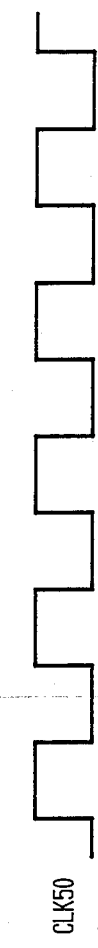
FIG. 3A  CLK50
FIG. 3B  ACTIVE
FIG. 3C  DLOSS
FIG. 3D  ACTLOSS

DIGITAL ACTIVITY LOSS DETECTOR

BACKGROUND OF THE INVENTION

1. Field of the Invention

The present invention relates generally to activity monitoring of a digital signal to provide an alarm indication when the digital signal input being monitored becomes inactive. More specifically, the invention also relates to a precise resolution and signal loss threshold setting technique for digital activity monitoring that is substantially invariant with temperature or power supply voltage variations.

2. Description of the Prior Art

In the known prior art, a retriggerable monostable multivibrator has been widely used to detect the loss of activity of a digital signal. The basic pulse duration of the monostable multivibrator defines the period of signal inactivity, e.g. the signal loss threshold, before an alarm is raised. Such an alarm is used in a telephone central office to indicate loss of input signal. The monostable pulse width is programmed by selection of external resistance and capacitance values. When the input signal is active it triggers and retriggers the monostable multivibrator to extend the output pulse. Thus the output of the monostable multivibrator remains HIGH (logic "1" state) as long as the time between successive signal pulses is less than the basic pulse duration of the monostable multivibrator. As soon as the time between two signal pulses is greater than the basic pulse duration of the monostable the output returns to its stable (LOW or logic "0") state indicating a loss of the monitored signal and generating an alarm.

The aforementioned known technique has two main disadvantages. The first disadvantage is the variation of the basic pulse duration of the monostable, and hence of the signal loss threshold, with component value and with temperature and power supply voltage variations. The second disadvantage is that the prior art circuit does not lend itself to integration in state of the art digital Application Specific Integrated Circuit (ASIC) technology, due to its analog nature.

Additional examples of the known prior art are U.S. Pat. No. 4,455,456 which describes a digital supervisory circuit for a telephone system in which the decoding or extracting of two supervisory signals which are superimposed on an analog telephone signal is provided. U.S. Pat. No. 4,196,362 describes a circuit for the generation of a clear or reset pulse upon application of a power supply voltage to the circuit so that the rest of the circuits can be placed into a known state after the application of power to the circuits. U.S. Pat. No. 4,017,724 describes a circuit for measuring and indicating the state of charge of a battery in a battery operated system. German patent No. 28 04 950 describes a circuit for the generation of signals having a selectable repetition frequency.

SUMMARY OF THE INVENTION

A digital activity detection circuit is provided for monitoring digital input signals and for generating an alarm when a predetermined signal loss threshold is crossed or reached, such that the signal loss threshold does not vary with temperature, with component value or with power supply variations. Precise resolution and simplified hardware are achieved in a novel arrangement of counters in the signal activity detector to determine the resolution and threshold of the detector, all in a digital arrangement without the use of retriggerable monostable multivibrators and in an ASIC fabricable integrated circuit technology, such as, for example, 2-micron CMOS technology.

BRIEF DESCRIPTION OF THE DRAWINGS

FIGS. 3(a) through 3(d) are timing diagrams useful in explaining the operation of the circuit described with reference to Figure.

DESCRIPTION OF THE PREFERRED EMBODIMENT

Figure 1:
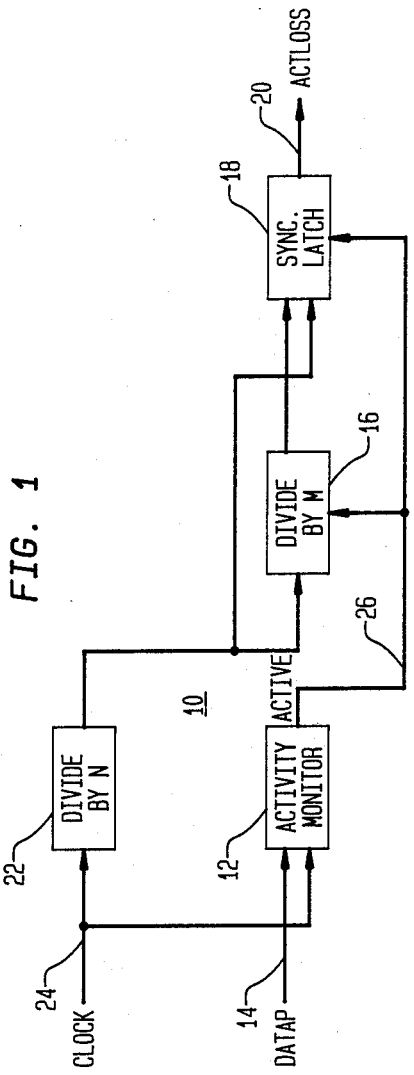
FIG. 1 is a block digram of a digital activity detector circuit in accordance with the present invention.

FIG. 1 shows a block diagram of a signal activity detector generally at 10. The activity monitor 12 is responsive to signals on the data positive (DATAP) signal line 14. These signals may be, for example, DS1 telecommunications inputs at 1.544 MH$_Z$, which are square shaped pulses, or DS2 digital inputs at 6.312 MH$_Z$, or RZ or NRZ inputs. As soon as signal activity on the DATAP signal line 14 is sensed, the activity monitor circuit 12 resets a divide-by-M circuit 16 and a synchronous latch 18. The activity monitor circuit 12 may consist of any well known circuit for counting data transitions and for providing a pulse whenever a transition is detected, e.g. by comparing the difference between two time slots, as is well known. If no signal activity is detected on line 14 for a period exceeding a certain predetermined threshold time period, the synchronous latch 18 is set to indicate an alarm condition (ACTLOSS) on line 20. The divide-by-M circuit 16, which may comprise a counter, defines the threshold of the activity detector 10 in terms of the output of a divide-by-N circuit 22. The divide-by-N circuit 22, which may also comprise a counter, divides down the clock input on line 24 and hence determines the resolution of the activity detector 10. A smaller value of N provides better resolution; however, the value of M must then be increased proportionately for the same threshold setting. A large value of N reduces the logic hardware when a plurality of activity detectors 10 are to be driven by the same clock, as is often the case in ASIC devices. The threshold of the detector 10 is given by the following equation:

$$\text{THRESHOLD} = N(M + \tfrac{1}{2}) \pm N/2 \text{ clock periods}$$

The aforementioned threshold, in terms of clock cycles, may be a standard telecommunications activity loss threshold, which for DS1 transmission is approximately 113.4 microseconds. The resolution for DS1 transmission of, for example, plus or minus 25 clock periods would be 16 microseconds.

Figure 2:
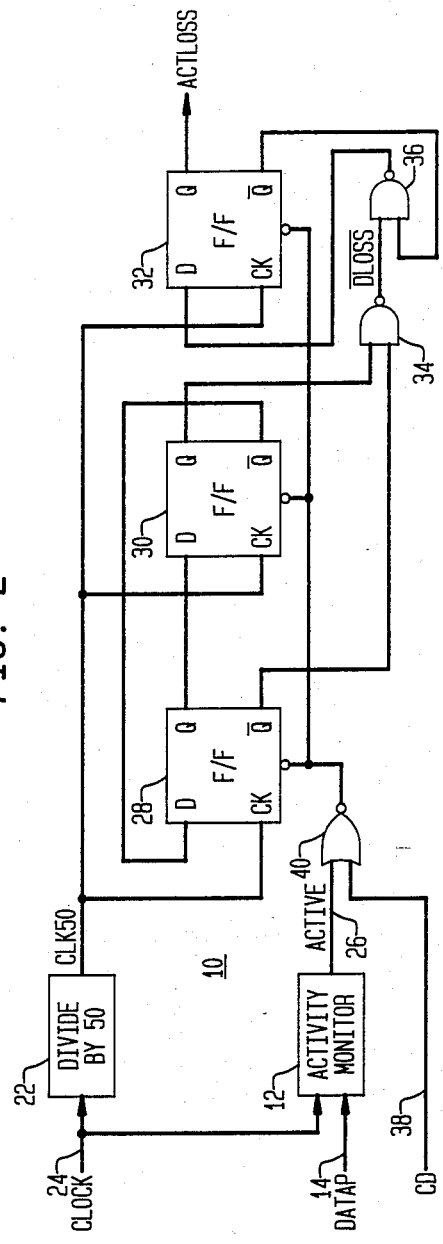
FIG. 2 is a more detailed block and circuit diagram of a digital activity detector circuit of the present invention.

FIG. 2 taken together with the waveforms of FIGS. 3(a)-3(d) shows a preferred embodiment of an activity detector 10 with a threshold of 175±25 clock periods where, for example N=50 and M=3. The activity monitor circuit 12 generates an ACTIVE pulse on line 26, as shown by waveform 3(b) whenever some signal activity on the DATAP signal line 14 is detected. The ACTIVE pulse clears the D-type Flip-Flops 28, 30 and 32.

Flip-flops 28, 30 and NAND gate 34 comprise a divide-by-three circuit. If there is no signal activity for three CLK50 pulses, as shown by waveform 3(a), the output of NAND gate 34 goes LOW, as shown by waveform 3(c). On the fourth pulse of the CLK50 signal, the synchronous latch 18, formed of NAND gate 36 and flip-flop 32 is set to indicate signal activity loss as shown in waveform FIG. 3(d). The latch 18 stays set until some signal activity is detected on the DATAP signal line 14. The divide-by-50 circuit may be comprised of any well known synchronous divide-by-50 counter. The clear signal CD on line 38 provides a means of directly clearing all the storage elements simultaneously and asynchronously, and this signal is coupled to flip-flop 28, 30 and 32 via NOR gate 40.

While the present invention has been described in connection with a preferred embodiment thereof, it is to be understood that additional embodiments, modifications and applications which will become obvious to those skilled in the art are included within the spirit and scope of the invention as set forth by the claims appended hereto. For example, for the same threshold setting, different values of M and N will result in different circuit designs to trade off between resolution and hardware minimization.

I claim:

1. A digital input signal activity loss detector circuit comprising:
    monitoring means having said digital input signal and a clock signal coupled thereto for detecting data transitions in said digital input signal at a clock signal rate, and for providing an output signal indicative of the detection of a data transition;
    divide-by-N circuit means for dividing said clock signal by N and providing an output;
    divide-by-M circuit means for dividing the output of said divide-by-N circuit by M and providing an output;
    synchronous latch means having coupled thereto the output of said divide-by-N circuit and the output of said divide-by-M circuit for generating a latch output indicative of a said digital input signal loss;
    logic means coupling the output of said monitoring means to the divide-by-M circuit means and to the synchronous latch means such that said output of said monitoring means indicative of a transition resets said divide-by-M circuit means and resets said synchronous latch means and when no data transition is indicated for a predetermined signal loss threshold time period, said synchronous latch is set to generate said latch output indicative of said digital input signal loss.

2. A digital input signal activity loss detector circuit in accordance with claim 1 wherein said threshold time period is derived from the output of said divide-by-M circuit and a resolution of said transition detecting is determined by the divide-by-N circuit such that said threshold is:

Threshold = N (M + ½) ± N/2 clock pulses where N and M are integers.

3. A digital input signal activity loss detector circuit in accordance with claim 2 wherein M=3 and N=50.

4. A digital input signal activity loss detector circuit in accordance with claim 1 wherein said divide-by-M and divide-by-N circuits include counter means for dividing down said input clock.

5. A digital input signal activity loss detector circuit in accordance with claim 1 wherein said synchronous latch includes a NAND gate and a flip-flop.

6. A digital input signal activity loss detector circuit in accordance with claim 1 wherein said latch output indicative of said digital input signal loss is coupled to telecommunications alarm indicating equipment.

7. A digital input signal activity loss detector circuit in accordance with claim 1 wherein said digital input signal is a DS1 telecommunications transmission signal.

8. A digital input signal activity loss detector circuit in accordance with claim 1 wherein said digital input signal is a DS2 telecommunications transmission signal.

9. A digital input signal activity loss detector circuit in accordance with claim 1 wherein said circuit is an integrated circuit implemented in CMOS technology.

10. A digital input signal activity loss detector circuit in accordance with claim 1 wherein said signal loss threshold time period is substantially invariant with temperature variation.

11. A digital input signal activity loss detector circuit in accordance with claim 1 wherein said signal loss threshold time period is substantially invariant with variations in power supply voltage.

* * * * *